(12) United States Patent
Matveev et al.

(10) Patent No.: US 11,715,287 B2
(45) Date of Patent: Aug. 1, 2023

(54) SYSTEMS AND METHODS FOR EXCHANGE OF DATA IN DISTRIBUTED TRAINING OF MACHINE LEARNING ALGORITHMS

(71) Applicant: Neuralmagic Inc., Somerville, MA (US)

(72) Inventors: Alexander Matveev, Cambridge, MA (US); Nir Shavit, Cambridge, MA (US)

(73) Assignee: Neuralmagic Inc.

( * ) Notice: Subject to any disclaimer, the term of this patent is extended or adjusted under 35 U.S.C. 154(b) by 1219 days.

(21) Appl. No.: 16/193,051

(22) Filed: Nov. 16, 2018

(65) Prior Publication Data

US 2019/0156215 A1 May 23, 2019

Related U.S. Application Data

(60) Provisional application No. 62/588,970, filed on Nov. 21, 2017, provisional application No. 62/588,324, filed on Nov. 18, 2017.

(51) Int. Cl.
*G06V 10/82* (2022.01)
*G06N 3/084* (2023.01)
(Continued)

(52) U.S. Cl.
CPC ............ *G06V 10/82* (2022.01); *G06F 18/217* (2023.01); *G06F 18/24133* (2023.01);
(Continued)

(58) Field of Classification Search
CPC .......... G06N 3/084; G06N 20/10; G06N 3/04; G06N 5/046; G06N 3/0445; G06N 3/0454;
(Continued)

(56) References Cited

U.S. PATENT DOCUMENTS

| 5,577,166 A | 11/1996 | Mizuno |
| 9,558,156 B1 | 1/2017 | Bekas et al. |

(Continued)

FOREIGN PATENT DOCUMENTS

| CN | 107832839 A | 3/2018 |
| EP | 3 037 980 | 6/2016 |

(Continued)

OTHER PUBLICATIONS

Krishnan et al., "A search technique for rule extraction from trained neural networks", Mar. 1999, Pattern Recognition Letters, vol. 20, Issue 3, pp. 273-280 (Year: 1999).*

(Continued)

*Primary Examiner* — Brent Johnston Hoover
(74) *Attorney, Agent, or Firm* — Pearl Cohen Zedek Latzer Baratz LLP

(57) ABSTRACT

Systems and methods may make exchanging data in a neural network (NN) during training more efficient. Exchanging weights among a number of processors training a NN across iterations may include sorting generated weights, compressing the sorted weights, and transmitting the compressed sorted weights. On each Kth iteration a sort order of the sorted weights may be created and transmitted. Exchanging weights among processors training a NN may include executing a forward pass to produce a set of loss values for processors, transmitting loss values to other processors, and at each of the processors, performing backpropagation on at least one layer of the NN using loss values received from other processors.

20 Claims, 8 Drawing Sheets

(51) Int. Cl.
*G06N 20/10* (2019.01)
*G06N 5/046* (2023.01)
*G06V 20/00* (2022.01)
*G06F 18/21* (2023.01)
*G06F 18/2413* (2023.01)
*G06V 30/19* (2022.01)
*G06N 3/04* (2023.01)

(52) U.S. Cl.
CPC .............. *G06N 3/04* (2013.01); *G06N 3/084* (2013.01); *G06N 5/046* (2013.01); *G06N 20/10* (2019.01); *G06V 20/00* (2022.01); *G06V 30/1916* (2022.01); *G06V 30/19173* (2022.01)

(58) Field of Classification Search
CPC ...... G06N 3/0481; G06N 3/044; G06N 3/045; G06N 3/048; G06V 30/194; G06V 20/00; G06V 10/82; G06V 30/1916; G06V 30/19173; G06K 9/6262; G06K 9/6271; G06F 18/217; G06F 18/24133
See application file for complete search history.

(56) References Cited

U.S. PATENT DOCUMENTS

| | | | |
|---|---|---|---|
| 9,811,775 | B2 | 11/2017 | Krizhevsky et al. |
| 9,818,059 | B1 | 11/2017 | Woo et al. |
| 10,157,045 | B2 | 12/2018 | Venkataramani et al. |
| 10,223,333 | B2 | 3/2019 | Chetlur et al. |
| 10,572,568 | B2 | 2/2020 | Narayanamoorthy et al. |
| 10,685,082 | B2 | 6/2020 | Bekas et al. |
| 10,719,323 | B2 | 7/2020 | Baum et al. |
| 2010/0076915 | A1 | 3/2010 | Xu et al. |
| 2011/0119467 | A1 | 5/2011 | Cadambi et al. |
| 2013/0138589 | A1 | 5/2013 | Yu et al. |
| 2013/0268469 | A1* | 10/2013 | Sharma ................. G06F 30/367 706/46 |
| 2015/0294219 | A1* | 10/2015 | Krizhevsky ............ G06N 3/084 706/25 |
| 2016/0224465 | A1 | 8/2016 | Morad et al. |
| 2016/0239706 | A1 | 8/2016 | Dijkman et al. |
| 2016/0328643 | A1 | 11/2016 | Liu et al. |
| 2016/0358070 | A1 | 12/2016 | Brothers et al. |
| 2016/0379109 | A1 | 12/2016 | Chung et al. |
| 2017/0103313 | A1 | 4/2017 | Ross et al. |
| 2017/0103317 | A1 | 4/2017 | Young |
| 2017/0132496 | A1 | 5/2017 | Shoaib et al. |
| 2017/0169567 | A1 | 6/2017 | Chefd'Hotel et al. |
| 2017/0193361 | A1 | 7/2017 | Chilimbi et al. |
| 2017/0200094 | A1 | 7/2017 | Bruestle et al. |
| 2017/0220524 | A1 | 8/2017 | Herrero Abellanas et al. |
| 2017/0316311 | A1 | 11/2017 | Pilly et al. |
| 2017/0316312 | A1 | 11/2017 | Goyal et al. |
| 2017/0032487 | A1 | 12/2017 | Ashari et al. |
| 2017/0372202 | A1 | 12/2017 | Ginsburg et al. |
| 2018/0046900 | A1 | 2/2018 | Dally et al. |
| 2018/0096226 | A1 | 4/2018 | Aliabadi et al. |
| 2018/0173571 | A1 | 6/2018 | Huang et al. |
| 2018/0253402 | A1 | 9/2018 | Redfern et al. |
| 2018/0315159 | A1 | 11/2018 | Ould-Ahmed-Vall et al. |
| 2018/0322390 | A1 | 11/2018 | Das et al. |
| 2018/0336468 | A1 | 11/2018 | Kadav et al. |
| 2019/0042250 | A1 | 2/2019 | Anders et al. |
| 2019/0042542 | A1 | 2/2019 | Narayanamoorthy et al. |
| 2019/0056916 | A1 | 2/2019 | Varma et al. |
| 2019/0138902 | A1 | 5/2019 | Matveev et al. |
| 2019/0156206 | A1 | 5/2019 | Graham et al. |
| 2019/0156214 | A1 | 5/2019 | Matveev et al. |
| 2019/0156215 | A1 | 5/2019 | Matveev et al. |
| 2019/0179818 | A1 | 6/2019 | Lee |
| 2019/0212982 | A1 | 7/2019 | Yoda et al. |
| 2019/0303743 | A1 | 10/2019 | Venkataramani et al. |
| 2019/0354894 | A1 | 11/2019 | Lazovich et al. |
| 2019/0370071 | A1 | 12/2019 | Mateev et al. |
| 2019/0370644 | A1 | 12/2019 | Kenney et al. |
| 2020/0034710 | A1 | 1/2020 | Sidhu et al. |
| 2020/0097826 | A1 | 3/2020 | Du et al. |
| 2020/0104717 | A1 | 4/2020 | Alistarh |
| 2020/0160181 | A1 | 5/2020 | Zlateski et al. |
| 2020/0160182 | A1 | 5/2020 | Matveev et al. |
| 2020/0193274 | A1 | 6/2020 | Darvish Rouhani et al. |
| 2020/0218978 | A1 | 7/2020 | Kopinsky |
| 2020/0342301 | A1 | 10/2020 | Miao et al. |

FOREIGN PATENT DOCUMENTS

| | | |
|---|---|---|
| WO | WO 2017/049496 | 3/2017 |
| WO | WO 2018/053835 | 3/2018 |
| WO | WO 2019/090325 | 5/2019 |
| WO | WO-2020/046859 A1 | 3/2020 |
| WO | WO-2020047823 A1 | 3/2020 |
| WO | WO-2020/072274 A1 | 4/2020 |

OTHER PUBLICATIONS

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Neural Network Inference on GPUs ."From Jul. 2017 "Conference '17", Apr. 3, 2019 (Apr. 3, 2019) Retrieved on Jan. 17, 2020 (Jan. 17, 2020)from <https://arxiv.orq/pdf/1802.10280.pdf entire document.

Georganas et al., "Anatomy of High-Performance Deep Learning Convolutions On SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.orq/pdf/1808.05567 .pdf entire document.

Kaya et al., "Scalable sparse tensor decompositions in distributed memory systems", SC'15: Proceedings of the International Conference for High Performance Computing, Networking, Storage and Analysis, IEEE, 2015.

Kim et al., "Designing Vector-Friendly Compact BLAS and LAPACK Kernels", SC17,Nov. 12-17, 2017, Denver, CO, USA.

Lascorz et al., "Bit-Tactical: Exploiting Ineffectual Computations in Convolutional Neural Networks: Which, Why, and How", Mar. 9, 2018.

Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020.

Papyan et al., "Convolutional neural networks analyzed via convolutional sparse coding." In: The Journal of Machine Learning Research. Jul. 17, 2017 (Jul. 17, 2017) Retrieved on Feb. 20, 2020.

Scardapane et al. "Group sparse regularization for deep neural networks.", In: Neurocomputing. Jul. 2, 2016 (Jul. 2, 2016) Retrieved on Nov. 16, 2019 (Nov. 16, 2019).

Smith et al., "SPLATT: Efficient and parallel sparse tensor-matrix multiplication", 2015 IEEE International Parallel and Distributed Processing Symposium, IEEE, 2015.

Wozniak et al., "GiMMiK-Generating bespoke matrix multiplication kernels for accelerators: Application to high-order Computational Fluid Dynamics", Computer Physics Communications, vol. 202, 2016, pp. 12-22.

Zhangxiaowen Gong et al. "Sparse Train: Leveraging Dynamic Sparsity in Training DNNs on General-Purpose SIMD Processors"; 2019.

Yu, Dong, Li Deng, and Frank Seide. "The deep tensor neural network with applications to large vocabulary speech recognition". IEEE Transactions on Audio Speech, and Language Processing 21.2 (2012): 388-396. (Year: 2012).

Kurtz, Mark, et al. "Inducing and Exploiting Activation Sparsity for Fast Neural Network Inference." Proceedings of the International Conference on Machine Learning. 2020.

Robert Lim; "Methods for Accelerating Machine Learning in High Performance Computing"; University of Oregon—AREA-2019-01.

(56) References Cited

OTHER PUBLICATIONS

Zhizhou Li et al.; "A CPU-based Algorithm for Traffic Optimization Based on Sparse Convolutional Neural Networks"; 2017 IEEE 30th Canadian Conference on Electrical and Computer (CCECE).
Baoyuan Liu et al.; "Sparse Convolutional Neural Networks"; CVPR 2015—Computer Vision Foundation—IEEE.
Hesham Mostafa et al.; "Parameter Efficient Training of Deep Convolutional Neural Networks by Dynamic Sparse Reparameterization"; Proceedings of the 36 th International Conference on Machine Learning, Long Beach, California, PMLR 97, 2019.
Israt Nisa et al.; "Sampled Dense Matrix Multiplication for High-Performance Machine Learning"; 2018 IEEE 25th International Conference on High Performance Computing (Hi PC).
Alwani et al., "Fused-layer CNN accelerators." 49th Annual IEEE/ACM International Symposium on Microarchitecture (MICRO), 2016, pp. 1-12.
Despande, Adit, A beginner's guide to understanding convolutional neural networks, Jul. 20, 2016, retrieved from https://adeshpande3.github.io/A-Beginner%27s-guide-to-understanding-convolutional-neural-networks/ entire. Document.
Du et al., "Width Provably Matters in Optimization for Deep Linear Neural Networks", May 27, 2019, arXiv:1901.08572v3.
Gale et al., "The State of Sparsity in Deep Neural Networks", Feb. 25, 2019, arXiv:1902.09574v1.
Han et al., "Learning both Weights and Connections for Efficient Neural Networks", 2015, Advances in Neural Information Processing Systems, vol. 28.
Hinton et al., "Distilling the Knowledge in a Neural Network", Mar. 9, 2015, arXiv:1503.02531v1.
Lavin et al., "Fast Algorithms for Convolutional Neural Networks", Nov. 10, 2015, arXiv:1509.09308v2.
Lecun et al., "Optimal brain damage", Advances in neural information processing systems, 1990, pp. 598-605.
Mishra et al., "Apprentice: Using Knowledge Distillation Techniques to Improve Low-Precision Network Accuracy", Nov. 15, 2017, arXiv:1711.05852v1.
Rusu et al., "Progressive Neural Networks", Sep. 7, 2016, arXiv:1606.04671v3.
Yang, Huanrui, Wei Wen, and Hai Li. "Deephoyer: Learning sparser neural network with differentiable scale-invariant sparsity measures." arXiv preprint arXiv:1908.09979 (2019).
Yuster, Raphael, and Uri Zwick. "Fast sparse matrix multiplication." ACM Transactions On Algorithms (TALG) 1.1 (2005): 2-13.
Park, Jongsoo, et al. "Faster cnns with direct sparse convolutions and guided pruning." arXiv preprint arXiv:1608.01409 (2016).
Paixao, Crysttian A., and Flávio Codeço Coelho. Matrix compression methods. No. e1049. PeerJ PrePrints, 2015.
https://www.kinematicsoup.com/news/2016/9/6/data-compression-bit-packing-101, Sep. 6, 2016.

* cited by examiner

SYSTEMS AND METHODS FOR EXCHANGE OF DATA IN DISTRIBUTED TRAINING OF MACHINE LEARNING ALGORITHMS

RELATED APPLICATION DATA

This application claims benefit from U.S. provisional patent application 62/588,970, filed on Nov. 21, 2017 and entitled "A Lossless Compression-Based Method for Reducing Network Traffic in Distributed Training of Machine Learning Algorithms", and this application claims benefit from U.S. provisional patent application 62/588,324, filed on Nov. 18, 2017 and entitled "A Method for Reducing Network Traffic for Distributed Training of Neural Networks with Fully Connected Layers" each incorporated herein by reference in its entirety.

FIELD OF THE INVENTION

The invention relates generally to machine learning; specifically to training neural networks using distributed systems.

BACKGROUND

Neural networks (NN) or connectionist systems are computing systems inspired by biological computing systems, but operating using manufactured digital computing technology. NNs are made up of computing units typically called neurons (which are artificial neurons, as opposed to biological neurons) communicating with each other via connections, links or edges. In common NN implementations, the signal at the link between artificial neurons may be for example a real number, and the output of each neuron may be computed by function of the (typically weighted) sum of its inputs, such as the ReLU rectifier function. NN links or edges typically have a weight that adjusts as learning proceeds. The weight increases or decreases the strength of the signal at a connection. Typically, NN neurons are divided or arranged into layers, where different layers may perform different kinds of transformations on their inputs and may have different patterns of connections with other layers. Typically, a higher or upper layer, or a layer "above" another layer, is a layer more towards the output layer, and a lower layer, preceding layer, or a layer "below" another layer, is a layer towards the input layer.

Such systems may learn to perform tasks by considering example input data, generally without being programmed with any task-specific rules, being presented with the correct output for the data, and self-correcting. During learning the NN may execute a forward-backward pass where in the forward pass the NN is presented with an input and produces an output, and in the backward pass (backpropagation) the NN is presented with the correct output, generates an error (e.g., a "loss"), and generates update gradients which are used to alter the weights at the links or edges.

Various types of NNs exist. For example, a convolutional neural network (CNN) is a deep, feed-forward network, which includes one or more convolutional layers, fully connected layers, and pooling layers. CNNs are particularly useful for visual and speech applications. Other NNs include for example long short-term memory (LSTM) networks.

In practice, a NN, or NN learning, is simulated by one or more computing nodes or cores, such as generic central processing units (CPUs, e.g. as embodied in personal computers) or graphics processing units (GPUs such as provided by Nvidia Corporation), which may be connected by a data network. A collection of such connected computers may be termed a pod, and computers used with NNs may be single socket (e.g. one main processor) or multi-socket (e.g. multiple processors in one machine, sharing some memory). One or more computing nodes may model a NN using known data structures. During or inference, the trained NN may for example recognize or categorize images, perform speech processing, or other tasks.

A NN may be modelled as an abstract mathematical object, such as a function. A NN may be translated physically to CPU or GPU as for example a sequence of matrix operations where entries in the matrix represent neurons (e.g. artificial neurons connected by edges or links) and matrix functions represent functions of the NN.

During learning, the NN, or the computing nodes modelling the NN, may be presented with training data. For example, in an image recognition application, a NN may learn to identify images that contain cats by analyzing example images that have been manually labeled as "cat" or "not a cat" and using the results to identify cats in other images. The NN may do this without any prior knowledge about cats, e.g., that they have fur, tails, whiskers and cat-like faces. Instead, during learning the NN automatically generates identifying characteristics from the learning material that it processes.

One method of training in a NN is data parallel learning, where (typically via a master node or core), the data or training sets are divided, and each core or node operates on the same NN, using forward and backward passes, on only a portion of the data independently, and after each forward/backward pass the nodes or cores exchange parameters (e.g. weights or gradients) with each other, or send them to the master, to come up with the right parameters for the iteration. For example, on each iteration, a master node may send one different image, or a set of images, and the same model of the NN, to each of four CPUs. Each CPU may execute a forward and backward pass over all layers of the model on its specific image, and send the resulting parameters to the master, which then creates an updated model from the parameters sent by all four CPUs. Each node or processor may at times store a different version (with different parameters) of the same NN.

When a node communicates its resulting weights over the network to other nodes after an iteration of training, a large amount of data may need to be sent. For example, in the data-parallel convolutional NN training approach, each node executes the full machine learning model on a subset of examples, so the number of parameters a node needs to communicate may be the same as the model size. For example, in case of AlexNet CNN, there may be 220 MB of parameters, and if 10 nodes operate on the data, 220 MB*10=2.2 GB of parameters are transferred in both directions over the network for each iteration. Network bottlenecks may slow the learning process. High bandwidth interconnections may be used to speed data transfer, but such systems are expensive compared to more low bandwidth networks, such as an Ethernet network.

In some NNs, a loss, inconsistency or error value may be calculated at the output or at an output layer, with possibly multiple loss values being created, e.g. one for each node in an output layer. The output layer or set of layers typically is or includes a fully connected (FC) layer, where each neuron in the layer accepts an input, edge or link from each neuron/output of a lower or preceding layer (e.g., a layer closer to the input). This fully connected layer is an example of a layer where the number of weights is high (because there may be a link between every input neuron and every output neuron) and yet the layer has a relatively low amount of compute, because the computation as a whole may be equivalent to a matrix multiply rather than a convolution. A loss for a network may represent the difference or inconsistency between the value or values output from the network, and the correct value/values that should be output given the data input to the NN. A loss value may be, for example, a negative log-likelihood or residual sum of squares, but may be computed in another manner. In NN learning, it is desired to minimize loss, and after receiving a loss the NN model may be updated my modifying weight values in the network using backpropagation.

SUMMARY

Systems and methods of the present invention may make exchanging data in a neural network (NN) during training more efficient. Exchanging weights among a number of processors training a NN across iterations may in some embodiments include sorting generated weights, compressing the sorted weights, and transmitting the compressed sorted weights. On each Kth iteration a sort order of the sorted weights may be created and transmitted. Embodiments may exchange weights among processors training a NN by executing a forward pass to produce a set of loss values for processors, transmitting loss values to other processors, and at each of the processors, performing backpropagation on at least one layer of the NN using loss values received from other processors.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1A:
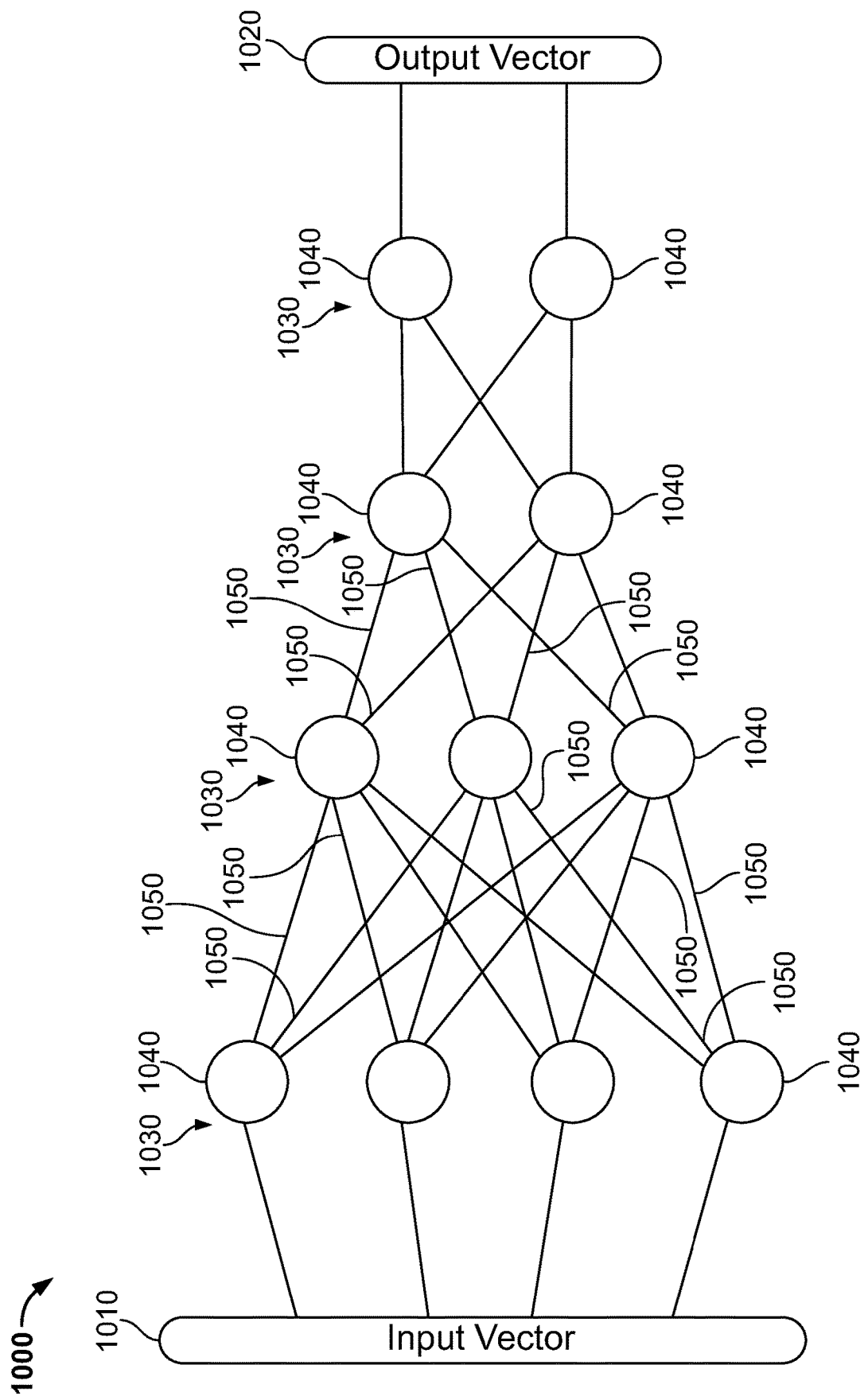
FIG. 1A is a block diagram of a neural network according to an embodiment of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention include systems and methods that may reduce the amount of data communicated during the training process of NNs (e.g. convolutional neural networks, or other networks) using a system including multiple nodes such as CPUs connected via a relatively slow connection such as an Ethernet or similar inexpensive network. CPUs, if used, may contain multiple cores, so that certain tasks may be done in parallel or concurrently: for example transmitting or receiving data, sorting, compression, portions of a backward or forward pass, etc. However, embodiments of the invention are applicable to other, non-NN tasks, for transferring large amounts of data. While a CNN is discussed as an example NN used, embodiments of the invention may be used with other NNs, such as LSTMs. Further, while CPU based machines are discussed, GPUs or other types of processors may be used. Embodiments of the present invention may be used with pods, and single socket or multi-socket systems, or other types of systems.

Embodiments of the invention may take advantage of the computational properties of a NN such as a CNN to distribute the computation and thus reduce the overall communication. Loss values may be transmitted by nodes to a master node or other nodes, which may use the loss values to calculate gradients and/or weights to modify the model. The computation of these parameters may be relatively computationally easy, e.g. have a low computational burden relative to other layers, as in the case of an FC layer, where the computation per output node is a simple dot product of its weights. In contrast, in this same FC layer, the number of weights (and similarly the gradient values per weight) is high relative to convolutional layers since in an FC layer each node may receive a link or edge from each node in its input layer. This number is even larger when compared to the network's overall number of loss values which is usually the number of outputs the NN has.

Some prior techniques use compression to reduce data size of data transmitted among nodes; however, such techniques achieve only a lossy reduction, e.g. reducing the granularity or accuracy of data on decompression. Such lossy compression might increase convergence time (e.g., where the NN converges to a state where the error of the calculations is small) or even preclude convergence at all. In some embodiments of the present invention, the computational properties of the weight distributions during NN training contribute to improving compression and distribution of the weights, and thus reduce the overall communication overheads, with, in some cases, no loss of accuracy (e.g. using lossless compression). The distribution or transmission of other parameters, such as loss values or gradients may also be made more efficient.

Figure 1B:
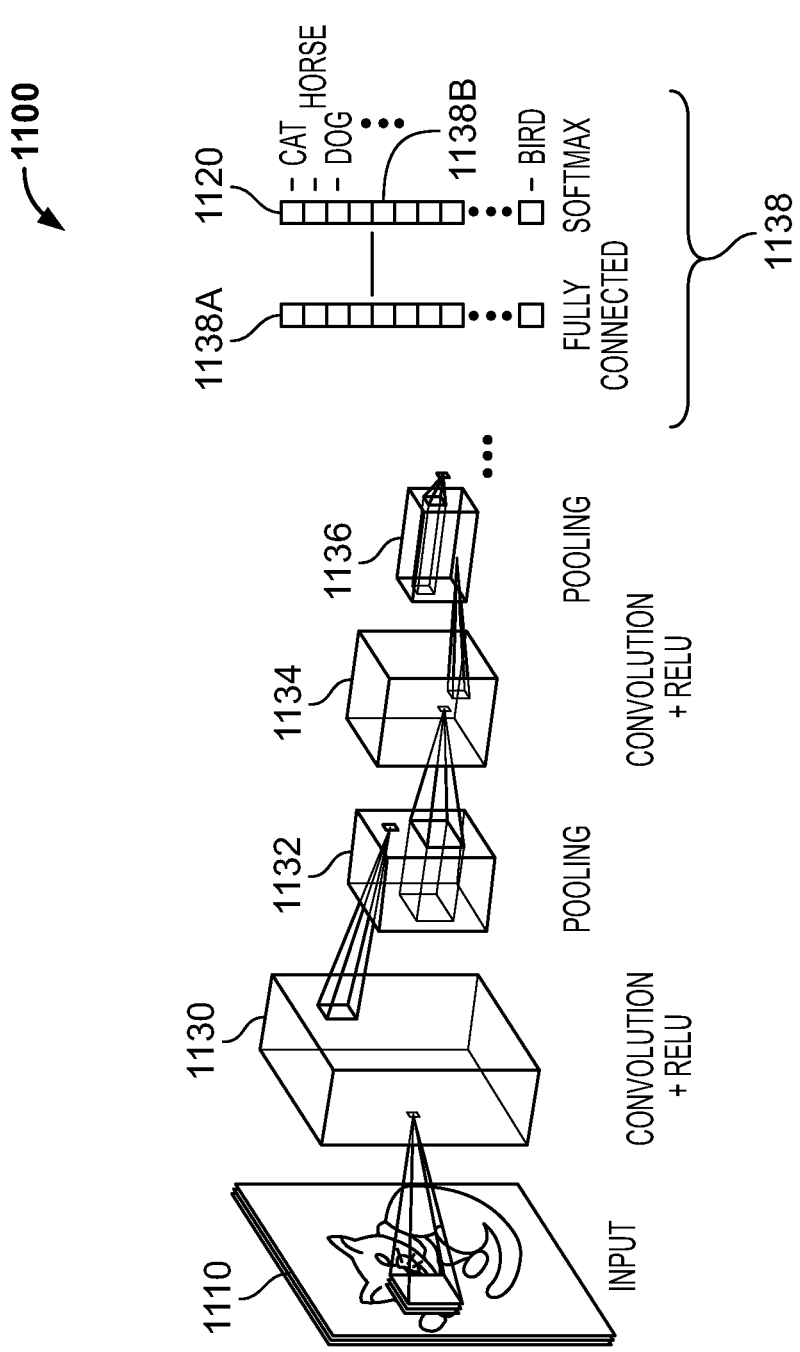
FIG. 1B is a block diagram of a neural network according to an embodiment of the present invention.

FIG. 1A is a simplified block diagram of a NN according to an embodiment of the present invention; in typical use thousands of neurons and links are used. NN 1000 may input data as for example an input vector 1010 of values (representing, e.g. a photograph, voice recording, or any sort of data), and may produce an output of signals or values, for example output vector 1020. NN 1000 may have neurons arranged into layers 1030, each including neurons 1040 connected to other neurons by links or edges 1050. FIG. 1B is a block diagram of a neural network according to an embodiment of the present invention. NN 1100 may input data, for example image 1110 (e.g. an input vector, matrix or other data) and may produce an output of signals or values, for example output vector 1120, which may for example indicate the content of or a description of the image. Other input data may be analyzed. NN 1100 may in one example have layers 1130 (convolution), 1132 (pooling), 1134 (convolution), 1136 (pooling), and one or more output layers 1138, which may include for example an FC layer 1138A and a softmax layer 1138B. Each layer may include neurons connected to other neurons by links or edges. The NNs in FIGS. 1A and 1B are typically simulated, and represented as data, for example in a system such as shown in FIG. 1C, below.

A convolutional layer may apply a convolution operation to its input, passing its result to the next layer. The convolution operation may for example emulate the response of an individual neuron to visual stimuli, and may for example include neurons processing data only for its receptive field. A convolutional layer's parameters may include a set of learnable filters (or kernels), which have a small receptive field, but extend through the full depth of the input volume. During the forward pass, each filter may be convolved across the width and height of the input volume, computing the dot product between the entries of the filter and the input and producing a 2-dimensional activation map of that filter. As a result, the NN may learn filters that activate when they detect some specific type of feature at some spatial position in the input. Stacking the activation maps for all filters along the depth dimension may form the full output volume of the convolution layer. Every entry in the output volume for a convolutional layer can thus also be interpreted as an output of a neuron that looks at a small region in the input and shares parameters with neurons in the same activation.

NNs used for classification tasks, e.g. classifying photographs into descriptions of the content, may produce, for each class i, an output $z_i$, sometimes called a logit, which may encode or represent the likelihood that a given example input should be classified to class i. Logits $z_i$, for each class i, (e.g., for image recognition dog, cat, llama, etc.) may be transformed into probabilities $q_i$ by comparing each $z_i$ to the other logits, in for example a softmax layer.

Figure 1C:
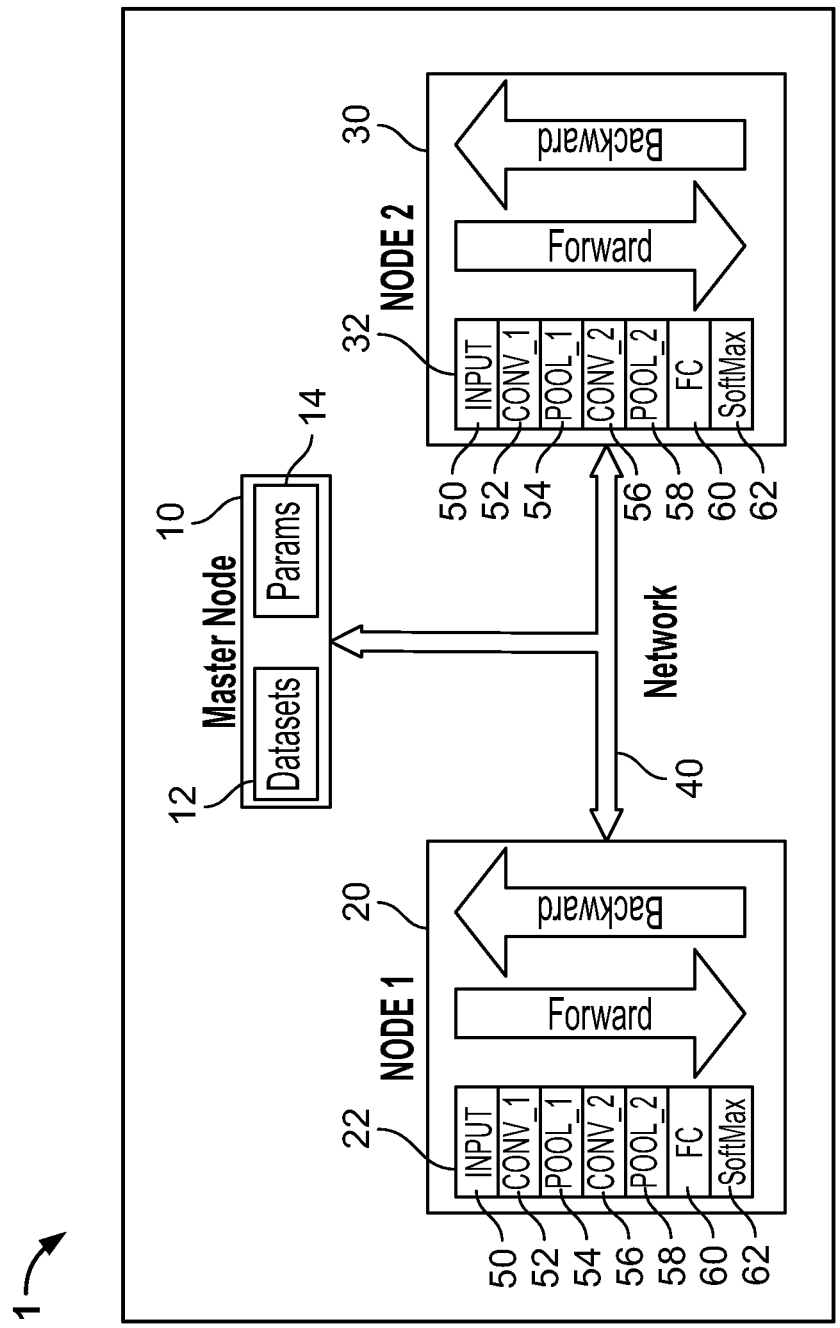
FIG. 1C is a block diagram of a system for training a neural network according to an embodiment of the present invention.

FIG. 1C is a block diagram of a system for training a neural network according to an embodiment of the present invention. Referring to FIG. 1C, a system of computing devices 1 may include computing nodes 10, 20 and 30, connected by one or more communications network(s) 40. Communications network 40 may be for example an Ethernet network, but may be one or more other communications networks. Node 10 may be a master node, distributing training data, collecting parameters and creating updated models, and nodes 20 and 30 may be training nodes, executing forward and backward passes on training data, sending parameters (e.g. weights for edges or links) to master node 10, and updating the nodes' internal representations of the NN after receiving data from the master node. In alternative embodiments, a training node (e.g. node 20 or 30) may function as a master node. In further embodiments, a fixed "master" node need not be used, and one or more training nodes may execute the functionality of a master node. Further, while only two training nodes are shown, other numbers of nodes may be used, for example 10 training nodes, 1,028 training nodes, or other numbers. Other numbers of master nodes may be used, for example an embodiment may include two master nodes and 16 training nodes, or 16 nodes total.

Master node 10 may include data 12, e.g. training sets (such as collections of images, audio files, etc.) and model data 14 representing a NN (e.g. data representing artificial neurons, links, weights, etc.) and including for example parameters such as weights, and possibly for example the arrangement of nodes, layers and edges. Each of nodes 10, 20 and 30 may model the same complete NN, including neurons, links, weights, etc. as the other nodes, but each of nodes 20 and 30 may train on a different set of data. Each node 20 and 30 may model the same NN as master node 10, and may include for example NN data 22 and 32. The NN may be for example a CNN, but may be another type of NN. For example, the NN modeled by NN data 22 and 32 may include an input layer 50, convolution layers 52 and 56, pool layers 54 and 58, a fully connected layer 60, and a softmax layer 62. Other numbers and types of layers may be used. The NN made of layers 50-62 may function and be simulated as is known in the art. A system such as shown in FIG. 1C may execute a trained NN at inference time, although at inference time such NNs may be executed by one processing node, e.g. a workstation, PC, server, etc.

Nodes may be for example CPU based systems (e.g. workstations, PCs), GPU based systems, or other systems. In one example embodiment, master node 10 is a CPU based system and training nodes may be other systems such as GPU based systems. Nodes 10, 20 and 30 may be or include structures such as those shown in FIG. 2. While in some embodiments a generic CPU (e.g. a workstation, a PC (personal computer), a multi-core system) is discussed as a node, embodiments of the invention may be used with other types of nodes, such as GPUs. Further, while example embodiments of the invention discuss a relatively simple, slow communications connection between nodes, such as an Ethernet, other networks or communications systems, such as relatively fast, expensive, and specially made systems, may be used.

Figure 2:
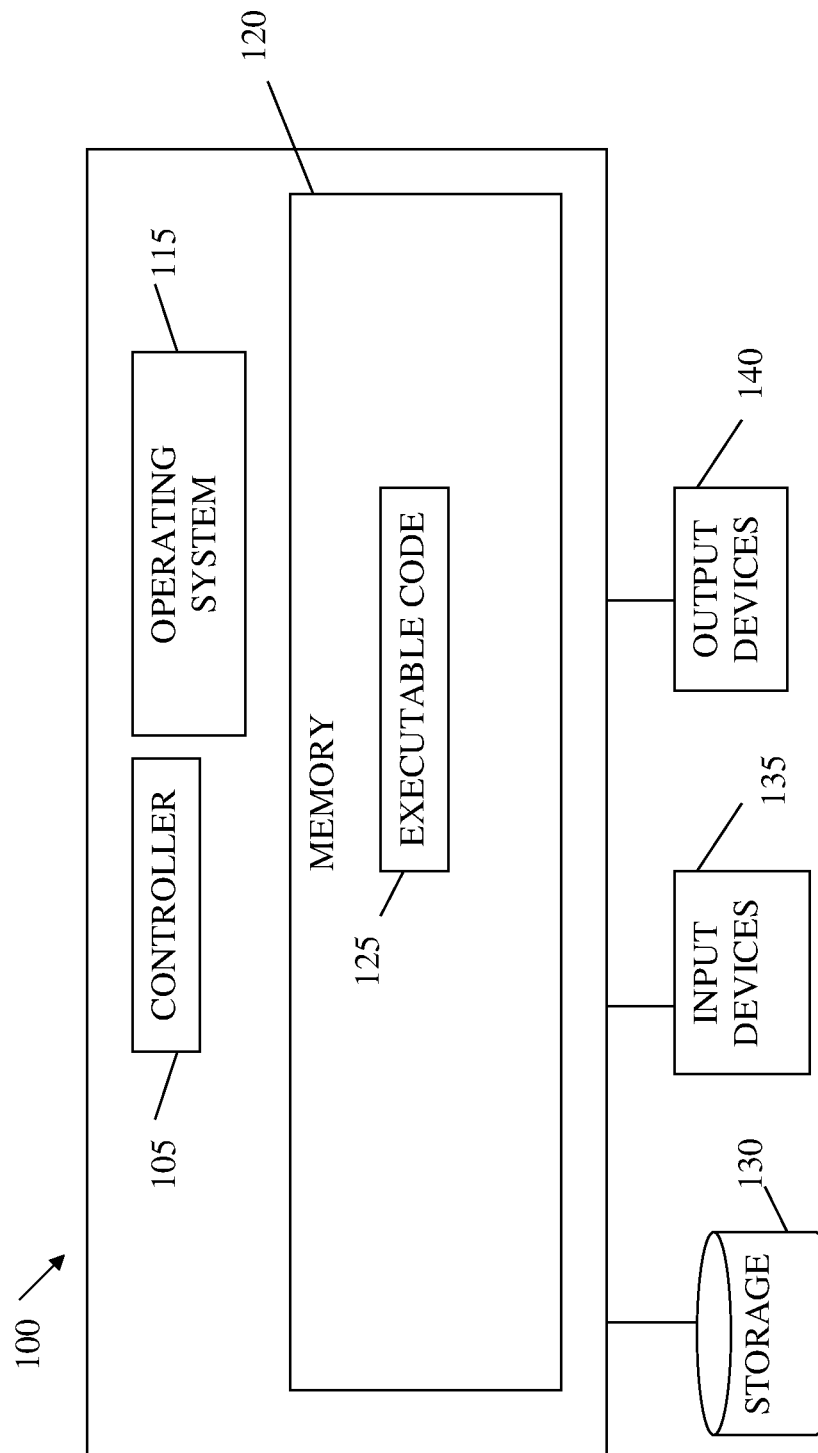
FIG. 2 is a high-level block diagram of an exemplary computing device which may be used with embodiments of the present invention.

FIG. 2 shows a high-level block diagram of an exemplary computing device which may be used with embodiments of the present invention. Computing device 100 may include a controller or processor 105 that may be or include, for example, one or more central processing unit processor(s) (CPU), one or more Graphics Processing Unit(s) (GPU or GPGPU), a chip or any suitable computing or computational device, an operating system 115, a memory 120, a storage 130, input devices 135 and output devices 140. Each of modules and equipment such as nodes 10, 20 and 30, and other equipment mentioned herein may be or include a computing device such as included in FIG. 2, although various units among these entities may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions to carry out a method (e.g. code 125), and/or data such as user responses, interruptions, etc.

Executable code 125 may be any executable code, e.g., an application, a program, a process, task or script. Executable code 125 may be executed by controller 105 possibly under control of operating system 115. For example, executable code 125 may when executed cause NN training, coordination of NN training tasks, NN execution or inference, etc. according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. may be stored in a storage 130 and may be loaded from storage 130 into a memory 120 where it may be processed by controller 105. In some embodiments, some of the components shown in FIG. 2 may be omitted.

Input devices 135 may be or may include for example a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In some NNs, during backpropagation, each neuron computes its own gradient for a link for the neuron, the gradient to be applied to adjust the weight of the link. (When discussed herein, a neuron taking action such as transmitting data, computing data, etc., may mean that a processor simulating the neuron performs a computation to simulate such action; e.g. a computing node simulating a number of neurons may perform the actual action that is ascribed to the neuron). A node that is simulating neurons may collect weights or other parameters and transmit them to a master node. The master node may receive and collect parameters and construct a model based on these parameters: e.g. a master node may collect all weights from nodes, and for each link, average the weights to produce an updated weight for that node, the weight being a part of the updated model. Techniques other than averaging may be used. In a data parallel learning, a number of nodes simulate forward/backward passes on the same nodes at the same time using different data sets: the resulting changes in parameters, e.g. weights, are sent by each node to a master node which creates an updated model from the parameters and sends the model back to the nodes. In some embodiments of the present invention one node acts as both a node simulating neurons and also the master node for all nodes. Typically parameters such as weights are represented as floating point (e.g. 32 bit) numbers, but may be represented in other ways, such as integers or numbers represented by different numbers of bits.

In embodiments of the present invention nodes may communicate parameters such as weights or other parameters with a master node or other nodes by first sorting or arranging them, for example according to the values of the parameters, and then applying a ZIP or a similar lossless compression algorithm (e.g., 7zip, or another suitable compression algorithm) to the sorted sequence. Sorting or arranging, e.g. in order of value, to place similar or same values adjacent to each other in an ordered list or vector, may allow for improved parameter compression, due to the nature of compression algorithms like ZIP. Sorted data is typically easier to compress than unsorted data because sequential values are in order when data is sorted so their non-negative differences can be encoded in place of the original values, and repeated values are all contiguous and can be encoded by including a count along with the first instance. After decompressing or unpacking the "zipped" or compressed data the sort order may be used to re-order the data to its proper order; thus in some embodiments a sort order is transmitted typically on the first iteration of training, and periodically on some but importantly not all successive iterations. In some embodiments, one iteration may include a forward and backward pass on a batch of multiple inputs, e.g. multiple images, at one time, after which the model may be updated. The distribution or transmission of other parameters, such as loss values or gradients may also be made more efficient by combining sorting with compression as taught herein; furthermore transmission among nodes other than a master node may take advantage of such methods. For example, non-master nodes may exchange loss data by arranging the data in order of value of individual loss parameters, compressing the data, transmitting, uncompressing, and rearranging according to a sort order.

The sort order itself, as a collection of data, does not compress well or at all, and thus transmitting the sort order with each compressed set of parameters would not typically result in bandwidth savings. Thus, in some embodiments a sorted order or order of the arranging is sent, which over time (as parameters change) becomes an approximate sorted order that suffices to reduce compression, allowing for lossless compression of parameters. In some embodiments, this approximate sorted order does not need to be sent with every set of parameters, and thus the cost of sending the sort order or order of the arranging be amortized over many iterations of compressed data being sent. Typically, in each iteration in-between when the sorted order is created and sent, the parameters are arranged or sorted to be ordered as the order of the last sort order created, before compression or "Zipping", and not according to the actual values of the parameters at that time. Thus the parameters in the intermediate iterations (between when the sorted order was created) may be arranged in an order which does not match that of an actual order sorted by value. The quality of the compression may be determined by the extent by which the order of parameters reflects the true sort order of the data. In some embodiments the effectiveness is greatly helped if the order over consecutive sequences or iterations of values transmitted does not change by much. A typical property of the sequences of weights in consecutive training batches or iterations of a neural network trained using backward propagation and stochastic gradient descent is that the differences between the consecutive sequences is small since they are determined by the gradients which are typically small. Thus, compressing the weights of consecutive sequences of weights from iterations of backward propagation and stochastic gradient descent have small differences in the sort orders and small differences between the values, thus lending themselves to good compression even based on the sort order of preceding iterations.

In some embodiments the sort/compress/transmit sequence, where sorting by value and creating a sort order occurs only periodically, can be in both directions—e.g. when the master sends parameters back to slave or "non-master" nodes—and also between slave nodes. The sort order may be an order that the sender (any node, master or slave node) creates and sends to the receiver, typically periodically. If the sort order is shared between two nodes—e.g. a master and slave node—and one node (e.g. the slave node) created it originally—the other node (e.g. the master node) need not create a sort order. However, any sender, master or slave node, may create a sort order if needed.

The typical pattern for distributed training of machine learning algorithms includes for example iterating or repeating:

1) Each node simulating a set of NN neurons executes a forward-backward pass that calculates or generates new updated weights of links or edges.

2) The system executes a parameter synchronization algorithm: for example nodes transmit parameters such as their newly calculated weights to a master node, or to other nodes. A master node may receive the parameters and update the model, e.g. by for each link averaging the weights received from nodes.

3) Each node may receive a model and may update its parameters, e.g. update the weights for its links or edges.

4) Repeat: the process may repeat starting with operation 1. The iteration may stop when for example a certain accuracy is achieved, after a certain number of runs or iterations, when training data is exhausted, or on other conditions.

In the second step when a node needs to communicate its parameters over the network to other nodes, problems may arise. For example, in the case of a data-parallel convolutional neural network training approach, each node executes the full machine learning model on a subset of examples, and thus the number of parameters a node needs to communicate is the same as the model size. For example, as discussed, in case of the AlexNet CNN, there may be for example 220 MB in parameters, and thus in the example case of 10 nodes, 220 MB*10=2.2 GB of parameters that are transferred over the network in both directions for each iteration. If in one case the time it takes to complete an iteration is approximately 30 ms, 2.2 GB must be transferred in 30 ms over the network to avoid any network bottlenecks. This requires a 2.2 GB/0.030=73 GB/sec network link, which is greater than most reasonably priced interconnections (much more expensive links may be available, but this requires expense and a specialized data link). This may prevent the system from scaling.

In one embodiment, nodes may compress parameters such as the weights generated at each node during the distributed training, before they are sent over the network. In one embodiment:

Nodes may sort or order the weights of the links or edges. Sorting may be in any suitable order, e.g. low to high, or high to low. Sorting may be based on for example the value of the weights themselves.

Nodes may compress their sorted weights by using ZIP or a lossless compression algorithm.

Sorting and compressing parameters may work well since there may be many similar numbers in the sorted sequence among the parameters for each node which reduces the overall entropy and allows ZIP type compression algorithms to compress well. However, the nodes that receive the sorted-and-compressed data should know the sort-order in order to be able to access the data appropriately. Typically, without the addition of sorting, the sending and receiving nodes have a common understanding of the order of the weights being sent. For example, each edge, link or weight in the NN may be assigned an address, index or a place in an ordered list. For example, both the sending and receiving nodes understand the first weight is for edge X of the network. After sorting, a new understanding—a sort order—may be sent. Sort-order or arrangement order information may be for example a table, one column being a weight, edge or link number or index, and the other column being the order in the compressed data, for each weight, edge or link. Sort order or arrangement order information may be for example a list or vector (e.g. an ordered list of numbers), where for each ordered entry X the number indicates the place, position or order, in the compressed list, of the parameter numbered or indexed X. Other forms for a sort order may be used.

Typically, sort-order information does not compress well, and sorting itself may be computationally expensive. Transmitting the sort order may be expensive in terms of network bandwidth, and thus transmitting sort information with each compressed list may be expensive and may eliminate the advantages of compression. Thus, in one embodiment of the invention, a sort-order is not generated and sent for each iteration, but rather only periodically or once every K'th iteration (K being an integer greater than one), so that the same sort-order is used across multiple iterations, and the cost of communicating and/or calculating the sort-order is amortized over them. K may be fixed as part of the system design, or may change periodically, over time or from iteration to iteration based on for example certain conditions.

In some embodiments, as the NN learns and changes its weights, yet many if not most of the weights do not change by a large percentage from iteration to iteration of training. Thus the actual order, from high to low or low to high, of the weights, changes from iteration to iteration but not by much. Typically, gradients which are applied to edge or link weights to change the weights are small. For example, a gradient may be +/−0.0002.

Thus in one embodiment, a process may include:
For iteration X:
a. Each node computing weights or another relevant parameter sorts the weights or other parameters, recording or saving the sort order or index order of the sorted weights, for example in a vector. The node may save or store the sort order locally for future use, as discussed further.
b. Each node compresses the sorted weights for example using ZIP or another suitable compression technology, typically lossless, to produce compressed sorted weights.
c. Each node transmits or sends the compressed or Zipped weights to, for example a master node.
d. Each node transmits or sends its sort order to, for example a master node. The master node decompresses the parameters, and reorders or resorts the parameters to their original order, according to the last sort order or indexing received.

For iteration X+1 through X+K−1 (not a "create sort" iteration):
a. Each node computing weights or another relevant parameter places, sorts or orders the weights according to the sort order or indexing order of iteration N, or the sort order last created for that node (each node computing parameters typically has a different sort order). No new sort order is created; thus the sorting is a rearrangement according to a prior sort order, e.g. the last or most recent sort order, as opposed to a sorting based on the value of the weights themselves. Typically, at this point, the parameter list is not fully sorted by value, but it is "almost-sorted", according to the previously computed sort order, so that ZIP or another suitable compression algorithm can benefit from it.
b. Each node compresses the parameters ordered by its prior sort order (the "sorted parameters").
c. Each node transmits the compressed parameters. The receiving node decompresses the parameters, and reorders the parameters to their original order, according to the last or most recent sort order or indexing received for the node that sent the parameters.

Iteration X+K is the same as iteration X.
For iteration X+1 through X+K−1 the process may be the same: arrange according to the same sort order as the previous iteration, compress, transmit. For iteration X+K, where K is a pre-set interval, such as 20 (causing a new sort to be created once every 20 iterations) the process may be the same as iteration X: sort, compress, transmit. Thus, the sort order may be created and transmitted only every K (e.g. 10, 20 or another suitable integer) iterations, so the cost of sending it will be amortized across K iterations. K can be variable rather than fixed. This works best as long as the sort order does not change much across iterations, which is typically the case for distributed machine learning where the parameters change slowly.

In some embodiments, nodes may transmit parameters after computing parameters for each layer, and thus parameters may be sent multiple times for each backward pass. Further, a master node may update model parameters after receiving parameters for a certain layer, and transmit the parameters back to the nodes after this: for example a node may compute backpropagation of parameters of the next lower layer while it is updating the parameters of layers above this layer whose backpropagation has already ended. Thus in some embodiments a sequence of backpropagation may include nodes updating parameters for layer X; nodes transmitting parameters for layer X; nodes updating parameters for layer X+1 (higher and more towards output than layer X) while master computes model for layer X (concurrently, or simultaneously); master sending model to nodes for layer X; nodes sending parameters for layer X+1; etc. Other orders may be used. Further, in some embodiments nodes may complete a full backpropagation of all layers before sending parameters.

Figure 3:
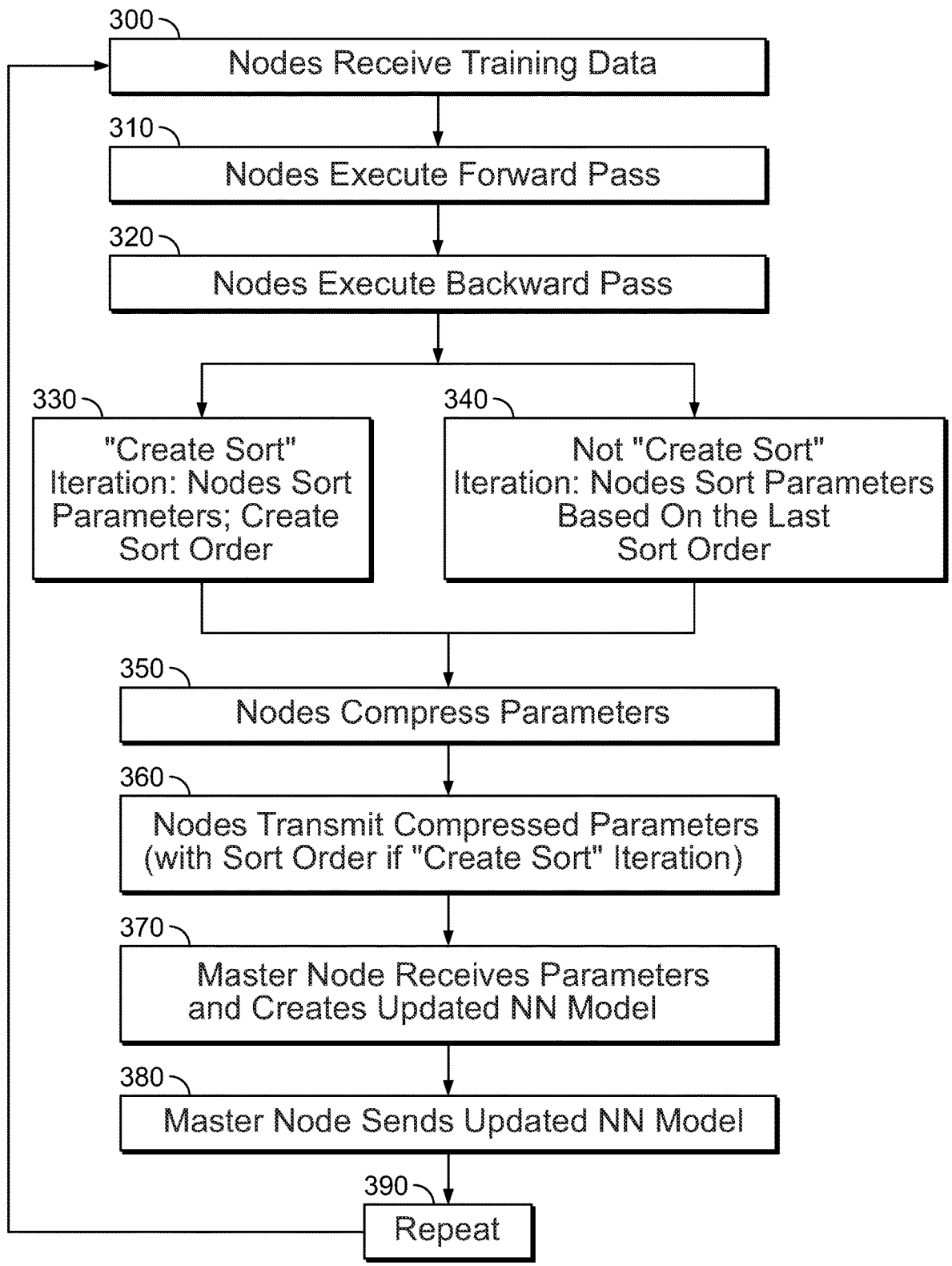
FIG. 3 is a flowchart of a method according to embodiments of the present invention.

FIG. 3 is a flowchart of a method for exchanging or transmitting parameters such as weights according to embodiments of the present invention, while conducting training on a NN. While in one embodiment the operations of FIG. 3 are carried out using systems as shown in FIGS. 1 and 2, in other embodiments other systems and equipment can be used. Further, embodiments of the example operations of FIG. 3 may be used with or combined with the embodiment shown in FIG. 5.

In operation 300 a number of nodes, e.g. computing nodes, or processors executing or simulating a neural network, may receive training sets or data from one or more master nodes. For example a master node may send one image each to a number of nodes. The nodes may be for example processors representing a NN using data, the NN including for example artificial neurons connected by edges or links. Thus the NN may be "virtual" and no actual physical neurons, links, etc. may exist, existing rather as data used by the nodes.

In operation 310, each node may execute a forward pass on the training data received, to produce an output.

In operation 320, each node may execute a backward or backpropagation pass, comparing its output for a NN to the expected output for the training data used, and calculating parameters such as weights for links or edges, or other data. In some embodiments, during each iteration, all layers in the NN, or at least two layers, may have parameters generated. In some embodiments, after each computation of a layer's parameters, the sorting/reordering, compressing and transmitting operations may occur for that layer. In some embodiments, during each iteration the nodes or processors during the backward or backpropagation pass calculate or generate gradients for links and calculate or generate weights for the links based on or using the gradients. For example, gradients may be factors that adjust the values of the weights.

In operation 330, If the iteration is a "create sort" iteration or a periodically occurring "ordering" iteration, e.g. every K'th iteration (typically including the first iteration), where K is an integer, each node may sort or arrange parameters created in operation 320, for example according to the values of the parameters, to create sorted parameters, e.g. sorted weights. A sort order, order of arranging, ordering, or index may be created and possibly saved or stored, based on the sorting process. Each node may have a different locally-created sort order. For example, while sorting the parameters, the new position of each parameter (when compared to the position in the parameter before sorting) may be saved as a sort order. Typically, parameters exchanged in a NN system have some inherent order understood by all entities in the system, and the sort process changes that order. Sorting or arranging may be for example low to high, high to low, etc. according to the numerical value of the parameter. The period between when sorting is performed according to the values of the parameters, and a sort order is created, may vary from iteration or cycle to iteration or cycle, and thus K may vary.

In operation 340, if the iteration is not a periodically occurring "create sort" iteration or "ordering" iteration but rather an "in-between" iteration, no new sort order is created, and sorting or arranging is performed on the parameters created in operation 320 based on the last sort order or order of arranging created by this node or processor (each node may store a different "last" sort order). Thus the sorting performed in operation 340 may be a rearrangement or re-ordering of parameters according to a prior sort order (e.g. the last Kth iteration, or the last time operation 330 was performed), and the "sorted parameters" are not sorted according some ranking of their own values, but rather are arranged according to a prior sort order.

In operation 350, the parameters sorted or rearranged in operations 330 and 340 may be compressed by a node, to produce compressed sorted parameters, e.g. compressed sorted weights, typically using lossless compression, although other compression methods may be used. For example, the parameters may be Zipped. As noted, the "compressed sorted parameters" may be not sorted according to their own order; rather they may be sorted or arranged according to a prior sort order. Typically, with an embodiment that sorts parameters before compressing, data size savings is most when parameters are weights, which typically have a similar order across iterations, as opposed to gradients, which often do not have a similar order across iterations. However, sorting and compressing may be performed with parameters other than weights, such as gradients, losses, etc.

In operation 360, each node may transmit or send its compressed parameters to a master node, or one or more other processors or nodes. If the iteration is a "create sort" iteration, e.g. every K'th iteration, the sort order, ordering, or index created in operation 330 may also be transmitted, for example with the compressed parameters.

In operation 370, a master node or processor may receive the parameters and create an updated model of the NN. In order to do so, the master may decompress the parameters, and place the parameters in the order according to the last sort order received. The parameters are typically re-ordered or re-sorted according to the last sort order received for the node that sent the parameters: thus the master node may maintain or store a different "last" sort order for each node sending it parameters. The master node reordering decompressed parameters to their original, proper order may be performed for data received from each node using a separately received sort order, as typically the sort order or indexing from each node is different.

In operation 380, the master node may send an updated model to the nodes performing the simulation, and the nodes may update their internal representation of the NN. The updated model may be sent using parameters sorted and compressed according to the relevant sort order.

In operation 390, the process may repeat or iterate, moving back to operation 300. The iteration may stop when for example a certain accuracy is achieved, after a certain number of runs or iteration, or on other conditions. Other or different operations may be used.

In some embodiments, a node receiving data—e.g. a master node—may use operations similar to operations 300-390 to transmit data to nodes, or non-master (e.g. "slave") nodes may use such operations to transmit data. For example, a master node may use the sort order received from node A to transmit model parameters back to node A, by sorting the parameters according to the last sort order received from node A, then compressing the data. Node A then decompresses the received model data and uses the last sort order it created to sort the data back to its original order. Alternately, a master node may create its own sort order periodically. In some embodiments, parameters may be transmitted using a sort and compress method (e.g. to or from a master) after each layer has data computed, but such data may also be data transmitted after a complete backward pass. In some embodiments, data transmitted using a sort and compress method may be from a node executing a forward/backward pass to another node executing a forward/backward pass. In some embodiments, data transmitted using a sort and compress method may include parameters other than weights: for example data may include gradient or loss data.

In some embodiments a node, typically when performing calculations relevant to an output layer (typically an FC layer), instead of using only the loss or error produced at that node to calculate weights or gradients for that layer, in addition use losses from other nodes and transmit or communicate their losses or loss values to other nodes. One or more nodes receiving the losses may receive all losses from all nodes simulating a forward pass, and then compute, in series for losses from each different node sending losses, a gradient and/or weight for each link or edge to the output layer. This may be in place of a master node receiving and averaging parameters for that particular layer. In one embodiment once the gradients are computed the gradients, or the final node weights after applying the gradients, may be averaged. The nodes receiving loss data may be a master node, or may be all nodes conducting a forward pass, in which case all such nodes perform the same calculations using losses. Since in certain NNs the number of links to neurons in an FC output layer is orders of magnitude greater than the number of loss values for the output layer, this may reduce the amount of data to be communicated (which may allow for a less expensive communications link), in exchange, in some embodiments, for the modest cost of multiple nodes using the global loss values to compute weights or gradients for the model. Further, typically computation for an FC layer, possibly involving a matrix multiplication, is less burdensome than for other layers such as a convolution layer, which may asymptotically involve as many as the square of the number of operations of the matrix multiply. Thus, in some embodiments, while a master node may compute new weights for the model for most layers by accepting weight values computed by nodes and for example averaging them, for an FC layer multiple nodes (or a master node) may compute the new weights (the weights after applying the gradients for the model) from the losses by performing the backpropagation computation step for the layer. This may lower the amount of data that is transmitted. This may be especially useful for a system using a small number of nodes, e.g. a pod of 16 or 32 nodes (other numbers of nodes may be used).

In some embodiments, the layer or subset of layers on which backpropagation is performed using non-local losses has associated with the layer a large fraction of the total weights in the NN but a much smaller fraction of the weight compute burden in the NN, even when computing using non-local losses. Since compression may be considered a translation of data movement burden (e.g. network burden) to data compute burden, this may be considered analogous to compression, in that there is a reduction in data movement burden (less weights are moved) and an increase in computation burden (each node redundantly performs substantially similar loss-to-weight calculations. However, given the architecture of some systems, this may result in faster processing. A measure of the amount of parameter transmission or network burden may be the number of bytes sent, or the number of parameters sent. A measure of the amount of compute or processing burden may be the number of computer operations (e.g. machine operations) needed to compute gradients and weights during backpropagation. A layer may have a different amount or burden of computation than other layers, and a layer's transmission of parameters such as gradients or weights may have a different amount or burden for this transmission than other layers. In some embodiments, the "compute" ratio of the compute burden of the layer or layers on which backpropagation is performed using non-local losses to the compute burden of the other layers in the NN on which backpropagation is performed using local losses may be smaller than the "transmission" ratio of the data transmission burden of the layer or layers on which backpropagation is performed using non-local losses to the transmission burden of the other layers in the NN on which backpropagation is performed using local losses. Since the number or amount of weights for a layer is analogous to or a measure of its transmission burden, in some embodiments the ratio of compute burden of layer(s) on which backpropagation is performed with non-local losses to the compute burden for the other layers in the NN may be less than the ratio of the number of weights for the layer(s) on which backpropagation is performed to the number of weights for the other layers in the NN. In some embodiments the layer(s) on which backpropagation is performed using non-local losses have more weights than another layer, or than all the other layers in the NN (e.g. cumulatively). In some embodiments the layer(s) on which backpropagation is performed using non-local losses has associated with the layer(s) a larger amount of weight values and/or a smaller amount of weight compute burden than all other layers in the NN cumulatively—e.g. than all the values and burdens for the other layers combined.

Figure 4:
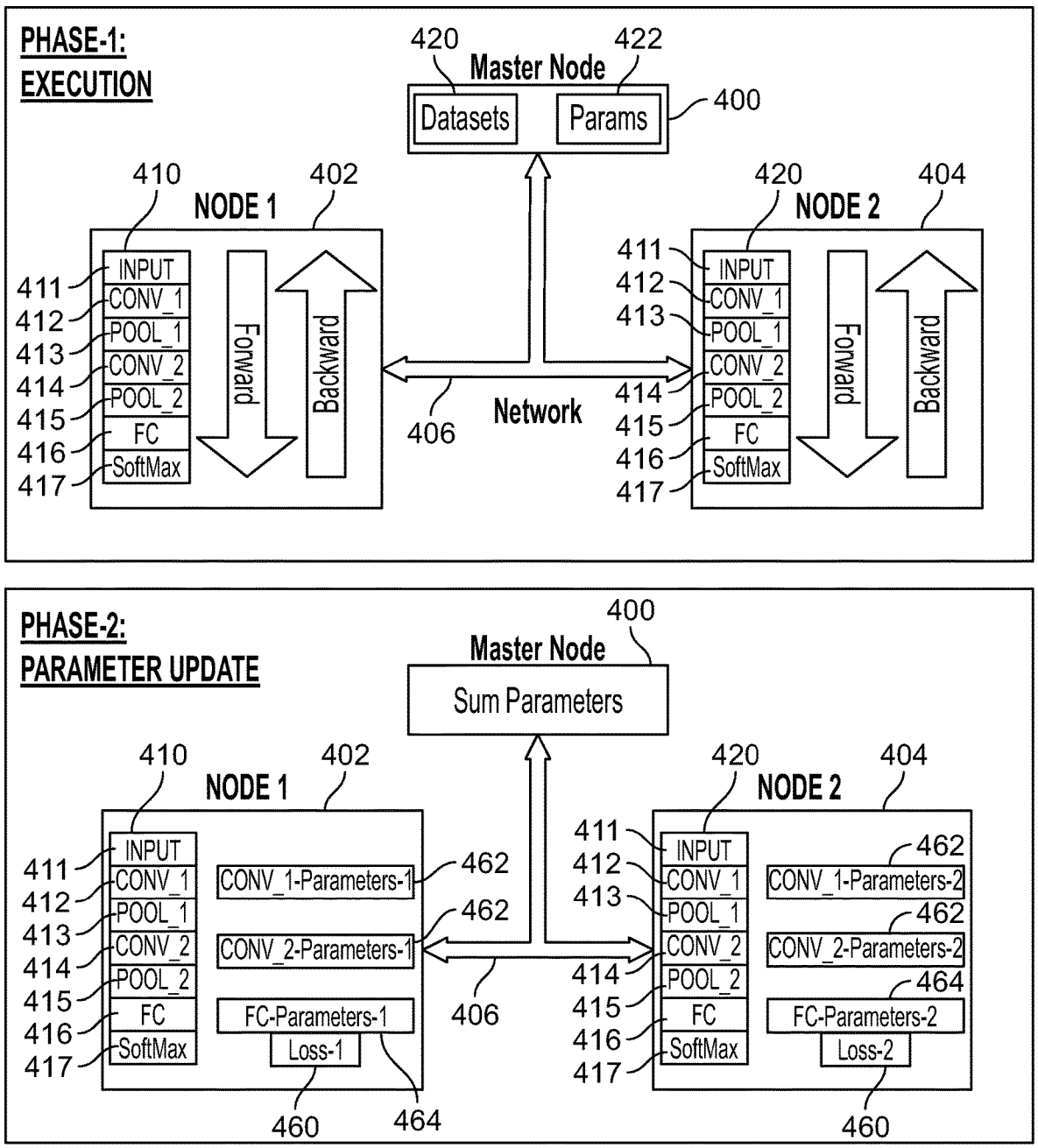
FIG. 4 depicts a prior art process for training using a multi-node system.

FIG. 4 depicts a prior art process for training using a multi-node system, using two nodes 402 and 404 and one master node 400; other numbers of nodes may be used and a master may be part of a node performing NN simulation. Nodes 400, 402 and 404 may be connected by for example network 406 and may simulate a NN 410 including layers 411, 412, 413, 414, 415, 416 and 417. Master node 400 may store datasets 420, e.g. training data, and model data and parameters 422. Embodiments of the present invention may improve on the system of FIG. 4. Referring to FIG. 4, in some processes for distributed (multi-node) training of machine learning algorithms operations such as the following may be used:

1) A master may send (operation 430) parameters or a model and input data to the nodes. Each node may execute (operation 432) a forward-backward pass that generates update gradients and weights.

2) Nodes execute a weight synchronization algorithm, which may involve a parameter update. This may involve nodes sending parameters to one or more master nodes (operation 440). In some embodiments, a loss 460 may be generated, and convolution layers may generate parameters e.g. parameters 462, and an FC layer may generate parameters 464. One or more master nodes may accept parameters to update the model (operation 442), e.g. by averaging weights, and send the model back to the nodes; or this may involve each node receiving all other nodes' parameters, so that each node can update its parameters based on averaging weights from all other nodes' executions just as the master would have done. As a result, in the standard data-parallel approach, the full model may be transmitted by the nodes to the master over the network.

3) Each node updates its parameters.

4) Iteration repeats at operation (1)

In operation 2, the weight synchronization, nodes may need to communicate parameters such as weights or gradients over the network to other nodes. For example, in the data-parallel learning approach, each node executes the full machine learning model on a subset of examples, and thus the number of parameters a node needs to communicate is the same as the model size, which is a large amount of data to communicate. In the case, for example, of the AlexNet CNN, there may be for example 220 MBytes of parameters, so for 10 nodes, 220 MBytes*10=2.2 GBytes of parameters must be transferred over the network in both directions for each iteration. The time it takes to complete an iteration can be for example approximately 30 ms, so 2.2 GBytes must be transferred in 30 ms over the network to avoid any network bottlenecks. This requires a 2.2 GB/0.030=73 GB/sec network link, faster than the capabilities of most reasonably priced network links. This may prevent the system from scaling.

In prior art systems, a synchronization procedure (operation 2 above) in distributed data-parallel training of neural networks included transmitting all of the parameters such as weights or gradients of the backward pass to a master node, or to the other nodes. For example, in the case of a six layer CNN with the layers INPUT, CONV_1, POOL_1, CONV_2, POOL_2, FC and SOFTMAX, after a node finishes the forward-backward pass for its set of input examples, there are new parameters generated for CONV_1, CONV_2 and the FC layers. At this point, a node may send all of these parameters to one or more other nodes (or a master node).

In one embodiment, for the FC final or output layers, of a NN such as CNN, the need to transmit the FC parameters to other nodes is avoided. Typically, compute and gradient memory requirements of the different neural network layers are not balanced or the same. For example, the (1) the amount of compute needed to execute (e.g. compute weights for, during training) the FC layer is low compared to other layers such as a convolution layer, and (2) the parameter memory requirement of the FC layer is relatively high (e.g. parameters for each FC node having links from each prior layer node must be stored), while for convolution layers memory requirements may be low (since typically convolution layer neurons are less connected to the layer inputting to the convolution layer compared to an FC layer). For example, in one example of the AlexNet CNN, the FC layer compute burden may be only 4% of the total CNN compute burden, while the parameter memory burden is 93% of the parameters for the NN. While embodiments are described as applied to an FC layer of a CNN, other types of layers can be used, and other types of NNs can be used. For example, embodiments may be applied to the training of any CNN that has a final layer in which the ratio of compute to data size is very small, that is, there is little computation a lot of parameter data to be transferred.

In one embodiment, operations such as the following may be performed, typically for each node simulating forward/backward passes. While in the following, an FC layer is given as an example of a layer where losses may be transmitted instead of other parameters, other embodiments may be used with layers other than FC layers, such as FC "style" layers that have large number of weights and low compute costs.

Figure 5:
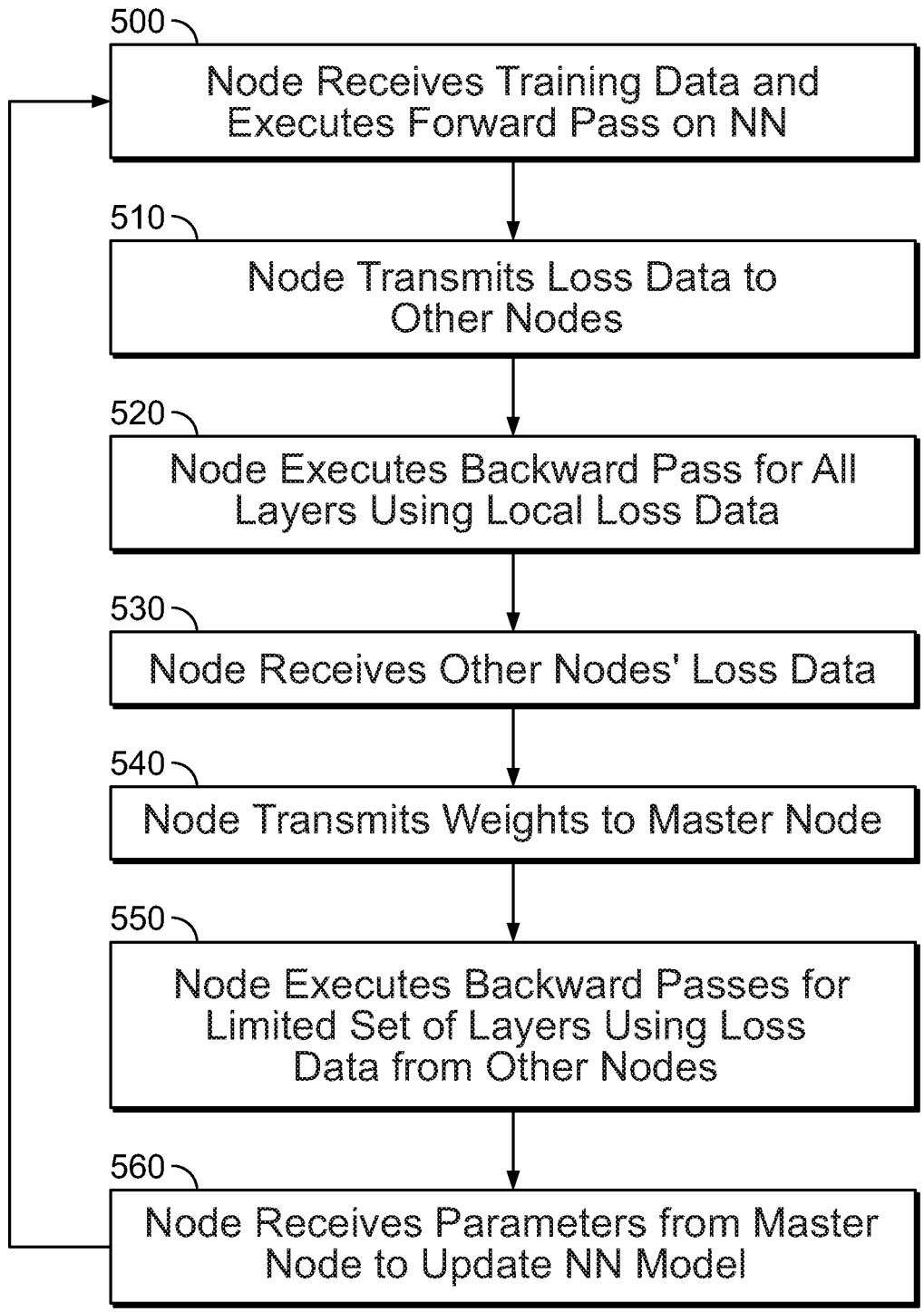
FIG. 5 is a flowchart of a method according to embodiments of the present invention.

FIG. 5 is a flowchart of a method of exchanging weights among nodes or processors according to embodiments of the present invention. While in one embodiment the operations of FIG. 5 are carried out using systems as shown in FIGS. 1 and 2, in other embodiments other systems and equipment can be used. Further, embodiments of the example operations of FIG. 5 may be used with or combined with the embodiment shown in FIG. 3. For example some or all of data such as parameters, weights, gradients, and/or loss data may, in an embodiment of FIG. 5, be transmitted using an embodiment of FIG. 3. Typically, embodiments of FIG. 5 achieve the most savings in data transmission when nodes are CPU-based. CPU systems may for example have advantages over GPU systems in memory size, which may be important as some embodiments of FIG. 5 require the storage of multiple sets of losses and gradients. However, embodiments of FIG. 5 may be used with systems where nodes are GPU-based. In one embodiment, for each processor or node i which is not a master:

In operation 500, the node or processor may receive training data and execute a forward-pass on the NN, which may generate a set of loss values, e.g. loss(es)_i. These may be termed, for each node, local losses: losses local to that node.

In operation 510, the processor or node may send or transmit the loss(es)_i to other nodes executing a forward pass (e.g. non-master nodes). In other embodiments, such losses may be sent to a master node, which may perform the calculations discussed herein.

In operation 520, backpropagation or a backward pass may occur at the node or processor. The node may execute a full backward pass for all layers using its own loss only ("local" losses), not including the other losses received, resulting in the new weights and gradients for all layers including the FC. Typically, during the full backpropagation pass using local losses, gradients for the layers which will have losses for other nodes applied (e.g. in operation 550) are not applied to modify layer weights. Rather, these gradients are stored or saved, to be used later in operation 550 to modify the weights: this is because modification of a model using should typically losses should typically be performed on the model which generated the losses, as opposed to a modified model. In some embodiments, prior to performing backpropagation using loss values received from a set of other processors or nodes (e.g. operation 550, the node may perform backpropagation using the loss values produced by the processor or node.

In operation 530, the node may receive the loss(es) of each other node. At this point, the node has multiple sets of losses (one for each node in the system, including its own loss(es)). As with other operations, this operation may be performed in an order different than implied; for example nodes sending and receiving losses may be done somewhat concurrently, and this may be performed while nodes are performing other processing, such as backpropagation.

In operation 540 the node may transmit or send parameters such as gradients or modified weights generated in operation 520, apart from or excluding those for the FC layer (or a layer to be used with an embodiment of the present invention), to other nodes or to a master node, substantially as in a standard data-parallel approach. While in some embodiments, the backward pass results for layers such as a convolution layer still are transmitted, the number of parameter values for such layers may be small relative to those for an FC layer, and thus large savings in network traffic may result from not sending the FC layer parameters and sending only the losses.

Operations such as sending and receiving data may be performed at any suitable time, and do not have to be performed in the order implied in FIG. 5. The order of operations in flowcharts (FIG. 5 and other flowcharts) in this application may be altered in certain embodiments if suitable. For example, transmitting losses may be performed after, or concurrently with, transmitting parameters; other suitable modifications may be implemented.

In operation 550 the node may perform backpropagation training on a limited subset of layers, e.g. at least one layer of the NN such as an FC layer possibly including layers from the FC to the output, using loss values received from a set of other nodes or processors, e.g. non-local losses. Application of gradients to weights on such layers may also be performed using saved gradients from operation 520. In some embodiments the layer(s) on which backpropagation is performed using losses from other nodes has associated with the layer a larger amount of weight values and a smaller amount of weight compute burden than another layer in the NN, e.g. when compared to a convolution layer. Note that losses have already been computed for this layer (and all layers) using the local losses in operation 520.

For example, for the losses of each other nodes ("non-local"), apart from the local losses of the node, the node may execute a backward pass for higher layers down to or until and including the FC layer, but typically not beyond (e.g. below, towards the input) the FC layer, one after the other, not continuing with the backpropagation for layers below (towards the input) and beyond the FC. This backpropagation may occur individually and separately for each set of non-local losses received from another node, as typically the losses cannot be combined or averaged across different nodes. For example, for each other processor for which loss values are received, the receiving processor may perform a separate backpropagation operation on the layers down to and including the FC layer. Thus in one embodiment, in operation 550, one backward pass is done down to and including the FC layer but not beyond for the loss of each node other than the local node, the gradients—but not weight changes—resulting from the backward pass accumulating or being stored. Typically, a model should be modified using losses generated for that model, and thus gradients should be applied to the un-modified model, rather than having gradients generated from a model modified from the model that generated the losses. Thus the gradients generated for the relevant layer in operation 520 using local losses, and the gradients generated in operation 550 based on non-local losses, are accumulated, and then applied to the NN model stored by the node by for example being applied to the relevant weights, or averaged then applied to the weights. Weights for all other layers may be updated based on weights received from the master or from other nodes. In some embodiments, the parallelization of the backpropagation of losses of all other parts of the model—e.g. backpropagation in one pass across nodes, then combining weights—except for the typically inexpensive FC layer and its typically inexpensive preceding layers, among threads, may allow for loss calculation time to be reduced. At this point this node has the full FC backward pass result (or in the case that the FC layer is not the final top-most layer, the full result for every layer from the output to and including the FC layer): each node has same weights for the FC layer, as if a master node had averaged the FC layer weights and sent the weights to the nodes. Such a technique may improve NN learning communication in that in some example NNs, the actual weights of the FC layer which may be 90% of the NN weights, are never transmitted. Rather, only the loss and the 10% of the weights (in one example) for the other layers are transmitted.

In operation 560 the node may receive parameters from a master node or other nodes, as a model update (e.g. their calculated average) or from other nodes (e.g. as individual weights to be averaged by the node) and may apply them to the NN being processed by the node, to update the model stored by the node. For example, the node may receive individual parameters such as weights for all other layers, apart from FC, or apart from the layers from the FC to the output inclusive. At this point the node may have new or updated weights: for all layers lower than the FC (towards the input), obtained from the master, and for layers above the FC (towards the output) and including FC from a locally performed loss based calculation. Thus improvement may be achieved in some embodiments in that weight updates for layers from the output through and including the FC layer, the node may execute a backward pass for all loss values, separately, and for layers between the FC layer and input layer, weight updates are calculated by a master averaging locally computed weight values. This may decrease communications burden while only slightly increasing processing burden.

The process may iterate again with operation 500. Typically, a NN used with embodiments of FIG. 5 includes, at least one fully connected layer, at least one input layer, and at least one convolution layer, and possibly other layers; see, e.g. the example NN structures of FIGS. 1 and 6. However, other structures of NNs may be used with a process such as in FIG. 5.

In some embodiments, non-master or slave nodes may send losses to one central node, such as a master node, which may execute backpropagation for a selected subset of layers (e.g. layers from FC to output inclusive) for each loss set, integrate the results into the model or update the model (e.g. by applying each resulting gradient set to the model), and send the updated model back to other nodes. This may be performed in conjunction with the master node receiving parameters regarding other layers such as weights or gradients and updating the model based on those other parameters: the NN model updated by the master using both loss data and parameters such as weights or gradients may be sent to the non-master nodes conducting training. Whether the master or a number of slaves perform sequential backpropagation for certain layers using loss data from multiple nodes, the backpropagation for those layers is typically independent for each loss set. E.g. a loss set from node A may be applied to the model used to generate the losses to generate gradients, a loss set from node B may be applied to the model used to generate the losses, etc., and the multiple sets of gradients may be then applied to the weights from the model used to generate the losses, for the relevant layer.

In some embodiments, there is no accuracy loss in using embodiments of FIG. 5, since the algorithm is semantically the same to the prior art data-parallel forward-backward pass algorithm. In some embodiments, operations such as: a node sending a loss or set of loss values; and the same node executing a backward pass (e.g. operation 530, a backward pass based on "local" losses for the processing node only) or a portion of a backward pass, may be done in parallel, or concurrently. Different cores within the same processor may be dedicated to different tasks. Improvements may result from tasks being done in parallel such as for example transmitting or receiving data, sorting, compression, portions of a backward or forward pass, etc.

Communications improvements may result when nodes communicate their losses to other nodes, so that each node can have all of the losses and compute the total or aggregated FC gradients locally. In some embodiments, nodes computing a forward pass (typically slave nodes as opposed to master nodes) may send their loss values to each other and each may compute FC gradients (e.g. gradients to be used to change weights inputting to neurons in an FC layer) and apply them to alter the FC weights, individually, which may allow for FC layer weights or gradients to not be transmitted; rather only weights of gradients for other layers are transmitted. In prior art systems, weights or gradients for the FC layer are transmitted, which takes up a lot of network bandwidth. This may result in significant improvement to NN learning technology, as in some example systems, 90% of the weights of the NN may be for the FC layer. In another example, 93% of the weights are in the FC layer in one example of the AlexNet CNN. A dramatic reduction in overall communications may result. In some embodiments, each node computes the total/aggregated FC gradient result which adds computation time to the node, but this is more than made up for with communications savings. For example, if there are N nodes in the distributed system, then the compute time added is FC_layer_compute_time*N: savings are maximized when the FC_layer_compute_time is small (relative to other layers) and the number of nodes in the system is small. However, savings may result from systems without such characteristics.

Such a system of transmitting losses instead of other parameters such as weights or gradients may be combined with the embodiments for improved compression using sorting, as discussed herein, which itself may result in a 3× reduction in communications. The two techniques in combination may in some examples result in a 30× reduction of network traffic, in a lossless way.

Figure 6:
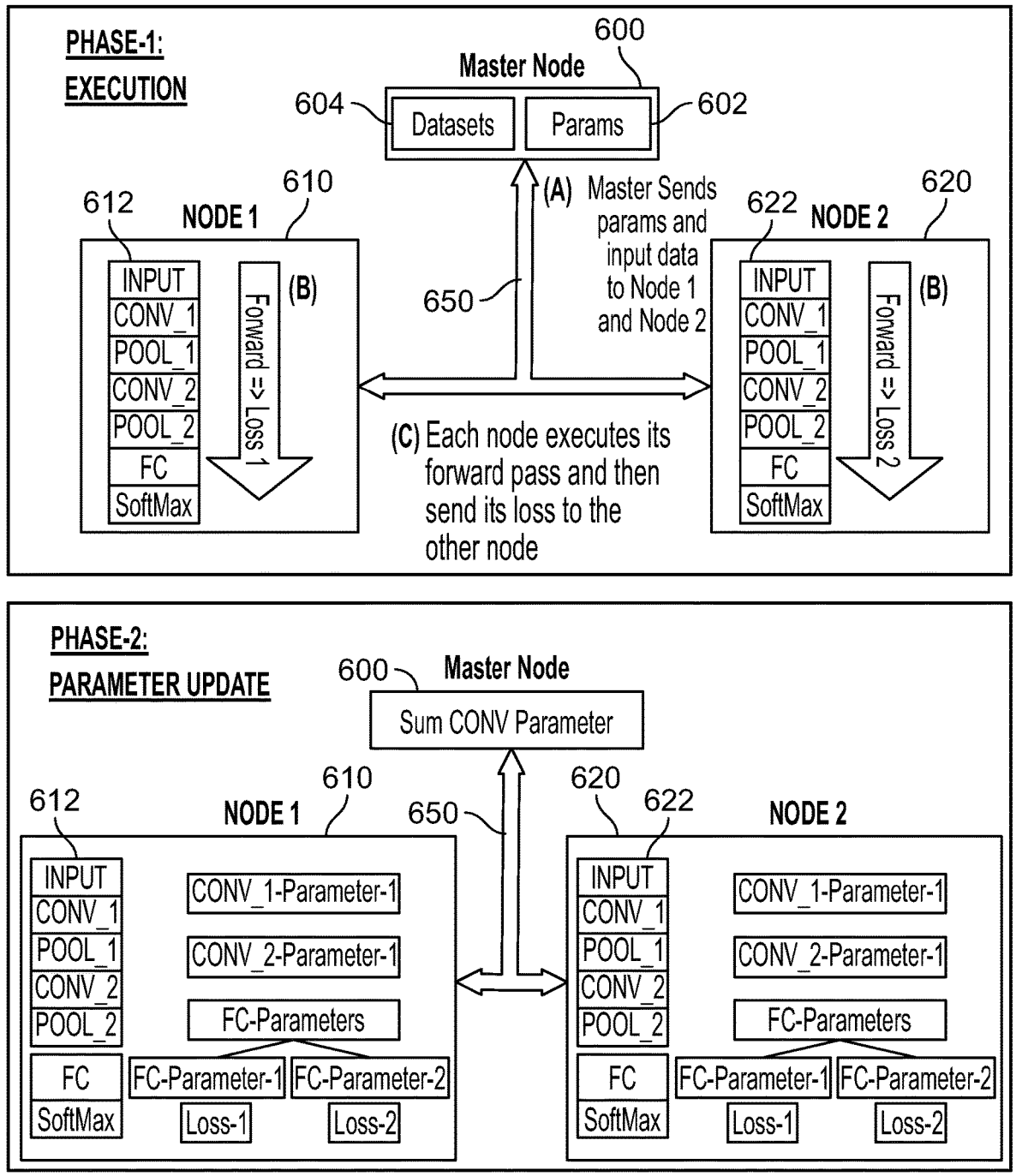
FIG. 6 is a diagram depicting a method of exchanging weights among processors according to embodiments of the present invention.

FIG. 6 is a diagram depicting a method of exchanging weights among processors according to embodiments of the present invention. While in one embodiment the operations of FIG. 6 are carried out using systems as shown in FIGS. 1 and 2, in other embodiments other systems and equipment can be used. Further, embodiments of the example operations of FIG. 6 may be used with or combined with the embodiments shown in FIGS. 3 and/or 5.

FIG. 6 shows an embodiment with two nodes 610 and 620 executing simulations, including models of a NN 612 and 622, one master node 600 including model information such as parameters 602 and data or training 604, and a network 650 connecting nodes 600, 610 and 620. Other numbers of nodes may be used. An iteration may include Phase 1, the execution, and Phase 2, the parameter update. In Phase 1, a master sends parameters and input data to the nodes, the nodes perform forward pass, and then each node 610 and 620 transmits its loss value(w) (e.g. the forward pass result) to the other node of 610 and 620. In Phase 2, each node has one loss data set from each node (itself and other nodes), in this example two losses. Each node may use these losses to compute the final result for FC gradients locally by itself. Then, each node may continue to execute the rest of the backward pass in a way similar to the standard data-parallel approach: for example each node may send convolution weight gradients to master 600, master 600 may sum convolution weight gradients of nodes 610 and 620 performing forward and backward passes, and may send the final result (e.g. a model) to nodes 610 and 620. In some embodiments, an improvement may result from FC gradients not being transmitted over network 640 at any point in time, which has the potential to provide an order of magnitude reduction in network traffic in many CNNs (without any loss in accuracy). NNs other than CNNs may be used, and while embodiments discuss treating an FC layer differently, embodiments of the present invention may perform local calculations for layers other than an FC layer.

In some prior art systems, most of the computation necessary to train or perform inference in neural networks is performed by specialized, massively parallel hardware devices, such as GPUs. Such devices may have thousands of relatively weak processing cores, specialized to perform "regular," predictable computation, which follows exactly the same control flow pattern, such as massive matrix multiplications.

Embodiments of the present invention may improve prior NN training and inference by for example allowing for less expensive, more common or commodity equipment to be used. For example, an Ethernet or less expensive data link may be used, and CPU based machines may be used instead of GPU based machines. While GPUs may be used with some embodiments of the present invention, typically, GPUs are not as powerful as CPUs at performing certain algorithms such as compression, which involves some sequential tasks: typically, GPUs are better at massively parallel task than CPUs, and CPUs may outperform GPUs at sequential tasks. Thus GPUs may not be as powerful at performing compression as discussed herein which may enable the use of less expensive network connections. Further, CPUs may be better than CPUs at interleaving, pipelining and complex parallel tasks which may be performed according to some embodiments of the present invention. GPUs may lack the large memory size CPU machines have, which may lower the ability of GPU machines to buffer a large amount of data. In some embodiments, a node may receive, and buffer or store, a large amount of input training data to process, and may process such data in sequence. In some embodiments, a node may multitask or interleave tasks, for example, at the same time, performing a forward pass for one layer of input data (e.g. an input image), sorting and/or compressing the parameter data for another layer.

While embodiments have been described in the context of NN learning, data processing in other contexts may make use of an embodiment of sort-and-compress method as described herein. Embodiments are applicable to any system in which the relative order of the elements to be compressed does not change much from one iteration to the next. Thus embodiments may be applied to systems other than machine learning. For example, an embodiment may be used to transmit pixel data for images. A sort-and-compress or sort-and-ZIP algorithm may be applicable to any set of numbers that are generated during iterations.

Embodiments of the present invention may be applicable to any set of numbers generated during iterations of distributed or other training, such as floating point parameters or gradients, or integer parameters or gradients that may be a result of quantization, 8 bit representations, etc.

Embodiments of the invention may be applicable to NNs computed with any sort of nodes, e.g. CPUs, GPUs, or other types of processors. However, embodiments may be particularly useful with CPU based nodes, as sorting and compressing (e.g. sequential compression) may be easier to implement efficiently, or may execute faster, on a CPU.

In some embodiments, it is possible to use quantization, a known compression technique for gradients. For example, a process may first quantize floating point parameters to integers, and then perform a sort-and-compress process as described herein.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of exchanging weights among a plurality of processors conducting training on a neural network (NN), the NN comprising neurons, the method comprising:
over a plurality of iterations:
at each of at least two processors of the plurality of processors:
sorting weights generated at the processors to create sorted weights;
compressing the sorted weights to produce compressed sorted weights; and
transmitting the compressed sorted weights to at least one master processor of the plurality of processors, the master processor updating a NN model based on the weights generated at the at least two processors;
wherein, on each Kth iteration of the plurality of iterations, K being an integer greater than 1:
a sort order of the sorted weights is created; and
the sort order is transmitted to least one processor of the plurality of processors.

2. The method of claim 1, wherein on an iteration which is not a Kth iteration, the weights are sorted using a last sort order created.

3. The method of claim 1, wherein K varies over time.

4. The method of claim 1, wherein the neurons are artificial neurons represented by data stored by the plurality of processors.

5. The method of claim 1, wherein the plurality of processors comprises a master processor and wherein the compressed sorted weights are transmitted to the master processor.

6. The method of claim 1, wherein, the NN comprises a plurality of layers, and wherein during each iteration:
weights are generated for at least two of the plurality of layers, and
sorting, compressing, and transmitting is performed for the weights for the at least two of the plurality of layers.

7. The method of claim 1, wherein the NN comprises a plurality of layers and a plurality of links connecting the neurons, and wherein during each iteration the at least two processors execute a forward pass and a backward pass to generate gradients for the links and to generate weights for the links from the gradients.

8. A method of exchanging parameters among a plurality of computing nodes, the method comprising:
for a plurality of parameters, over a plurality of iterations including a periodically occurring ordering iteration:
at a first computing node:
if the iteration is an ordering iteration, arranging the parameters by value and storing an order of the arranging;
if the iteration is not an ordering iteration, arranging the parameters by a stored last order of the arranging;
compressing the arranged parameters to produce compressed parameters; and
sending the compressed parameters to a second computing node, the second computing node updating a NN model based on the parameters.

9. The method of claim 8, wherein the ordering iteration occurs every Kth iteration, K being an integer.

10. The method of claim 9, wherein K varies over time.

11. The method of claim 9, wherein the parameters are weights for artificial neurons represented by data stored by at least one of the plurality of computing nodes.

12. The method of claim 9, wherein the second computing node is a master node.

13. The method of claim 9, wherein, the NN comprises a plurality of layers and a plurality of links connecting the neurons, and wherein during each iteration the node executes a forward pass and a backward pass to generate gradients for the links and to generate weights for the links from the gradients.

14. A system comprising a plurality of nodes conducting training on a neural network (NN), the NN comprising neurons, each node comprising:
a memory; and
a processor; the processor comprising at least one node configured to:
over a plurality of iterations:
sort weights generated at the processor to create sorted weights;
compress the sorted weights to produce compressed sorted weights; and
transmit the compressed sorted weights to least one other node of the plurality of nodes, the other node updating a NN model based on the weights generated at the processor;
wherein, on each Kth iteration of the plurality of iterations, K being an integer greater than 1:
a sort order of the sorted weights is created by the processor; and
the sort order is transmitted to least one node of the plurality of nodes.

15. The system of claim 14, wherein on an iteration which is not a Kth iteration, the weights are sorted using a last sort order created.

16. The system of claim 15, wherein K varies over time.

17. The system of claim 14, wherein the neurons are artificial neurons represented by data stored by the plurality of nodes.

18. The system of claim 14, wherein the plurality of nodes comprises a master node and wherein the compressed sorted weights are transmitted to the master node.

19. The system of claim 14, wherein, the NN comprises a plurality of layers, and wherein during each iteration:
weights are generated for at least two of the plurality of layers, and
sorting, compressing, and transmitting is performed for the weights for the at least two of the plurality of layers.

20. The system of claim 14, wherein, the NN comprises a plurality of layers and a plurality of links connecting the neurons, and wherein during each iteration the processor at least one node executes a forward pass and a backward pass to generate gradients for the links and to generate weights for the links from the gradients.

* * * * *